(12) United States Patent
Martin et al.

(10) Patent No.: US 6,606,607 B1
(45) Date of Patent: Aug. 12, 2003

(54) INDIVIDUALIZED, REAL-TIME, INTERACTIVE E-COMMERCE AUCTION

(75) Inventors: Sam Martin, Schaumburg, IL (US); Constance J. Anders, Roselle, IL (US)

(73) Assignee: MCJ Ventures, Inc., Schaumburg, IL (US)

( * ) Notice: Subject to any disclaimer, the term of this patent is extended or adjusted under 35 U.S.C. 154(b) by 0 days.

(21) Appl. No.: 09/334,838

(22) Filed: Jun. 17, 1999

(51) Int. Cl.[7] .............................................. G06F 17/60
(52) U.S. Cl. ........................................ 705/37; 705/27
(58) Field of Search ............................ 705/37, 35, 36, 705/26, 27, 1, 400, 80

(56) References Cited

U.S. PATENT DOCUMENTS

| | | | |
|---|---|---|---|
| 5,664,115 A | * 9/1997 | Fraser .......................... | 705/37 |
| 5,689,652 A | * 11/1997 | Lupien et al. ................. | 705/37 |
| 5,727,165 A | * 3/1998 | Ordish et al. .................. | 705/37 |
| 5,794,207 A | 8/1998 | Walker et al. ................. | 705/23 |
| 5,905,975 A | * 5/1999 | Ausubel ....................... | 705/37 |
| 6,202,051 B1 | * 3/2001 | Woolston ...................... | 705/27 |
| 6,266,651 B1 | * 7/2001 | Woolston ...................... | 705/27 |
| 6,401,080 B1 | * 6/2002 | Bigus et al. .................. | 705/37 |
| 6,415,269 B1 | * 7/2002 | Dinwoodie ................... | 705/37 |

FOREIGN PATENT DOCUMENTS

| | | | | |
|---|---|---|---|---|
| JP | 405303582 A | * 11/1993 | ........... | G06F/15/28 |
| JP | 40532690 A | * 12/1993 | ........... | G06F/15/28 |
| JP | 405346933 A | * 12/1993 | ........... | G06F/15/28 |

OTHER PUBLICATIONS

Gagliano et al., "Auction allocation of computing resources", Jun. 1995, Communications of the ACM, v38n6, pp. : 88–102.*

GoTo.com, "New Service Puts Ad Auction, Search Engine Under One Roof", Apr. 1998, Cowles–SIMBA Information, Electronic Advertising & Marketplace Report, v12, n8, pNA.*

* cited by examiner

*Primary Examiner*—Hani M. Kazimi
(74) *Attorney, Agent, or Firm*—Emerich & Dithmar

(57) ABSTRACT

A real-time, interactive auction process for use in electronic commerce includes buyer and administrator interfaces coupled to a central controller via a global information network. The central controller processes and stores customer and product information as well as offer (acceptable price) information and order (bid) information. Each product is assigned a minimum acceptable price (MAP) as well as a virtual minimum acceptable price (VMAP). The VMAP is always greater than MAP and is assigned one of three parameters, loose, medium, or tight. The VMAP is generated randomly within a loose, medium, or tight range of the MAP. The bidder can submit as many as three bids with counter offers made to the first two bids. If the third bid is declined, the bidder is locked out of the bidding process.

8 Claims, 10 Drawing Sheets

INDIVIDUALIZED, REAL-TIME, INTERACTIVE E-COMMERCE AUCTION

FIELD OF THE INVENTION

This invention relates generally to interactive processes carried out on an electronic network and is particularly directed to a real-time, interactive auction process particularly adapted for use in electronic commerce such as carried out on a global information network.

BACKGROUND OF THE INVENTION

An auction is a public sale of property to the highest bidder where the price is determined by the last of a series of successive increasing bids. The auction may be silent or oral and may include many bidders, or may be limited to just one bidder. When only one bidder is involved, the bidder's offer is either accepted or rejected. In the case of a rejection, the auctioneer typically proposes a counter offer.

The auction method of selling products, where the price is not fixed by the seller, is increasingly being used in electronic commerce (e-commerce) such as on a global information network. Offers, bids, counter offers and rejections are transmitted on the network. Bids are generated at the buyer's end, or terminal, while offers, counter offers and rejections are generated at a central location where the auction administrator is located. Most current on-line auction systems involve many bidders submitting bids against one another over a specified time period for a given item. Other approaches require human control and inputs at the site of the administrator for accepting or rejecting bids. The human element in administering the auction increases the cost of the auction, introduces the possibility of human error, and prolongs the time required in the acceptance or rejection of bids.

The present invention addresses the aforementioned limitations of the prior art by providing an individualized, computerized, real-time flea market bidding engine for conducting auctions on a global information network such as the Internet. Decisions regarding bid acceptance/rejection are made by a programmed central controller and a counter offer or rejection is transmitted to the bidder via the network with minimal delay.

OBJECTS AND SUMMARY OF THE INVENTION

Accordingly, it is an object of the present invention to provide an interactive auction process for use over an electronic medium such as a global information network involving the submission of one or more bids, by a perspective buyer and an acceptance or counter offer in response by the seller.

It is another object of the present invention to provide an interactive auction process for use in electronic commerce in which a potential purchaser may make as many as three bids on an item for sale and is locked out of the bidding process if the third and final bid is not accepted.

Yet another object of the present invention is to provide a computerized auction process for use on an interactive electronic network where a minimum acceptable price for an item being auctioned off which is greater than the cost of the item is randomly changed at the start of each bidding procedure making it impossible for the bidder to ascertain the minimum acceptable price.

A further object of the present invention is to provide an individualized auction procedure for accommodating a single bidder where the bidder can enter as many as three offers which are either accepted or rejected in accordance with pre-established price limits.

This invention contemplates an auction method for use in e-commerce where an administrator of the auction is connected to a bidder by means of a global information network, the method comprising the steps of assigning a minimum acceptable price (MAP) to a product based upon the cost of the product and a manufacturer's suggested retail price (MSRP) for the product, where MSRP>MAP; calculating a virtual minimum acceptable price (VMAP) for the product, where VMAP is a randomly calculated percent greater than MAP for the product, and wherein VMAP is calculated by assigning a tight, medium or loose bidding range for the product, with VMAP having a tight bidding range assigned a value X% greater than MAP, VMAP having a medium bidding range assigned a value Y% greater than MAP, and VMAP having a loose bidding range assigned a value Z% greater than MAP, where X>Y>Z; receiving an offer for a product from a bidder via the global information network; comparing the offer with VMAP and MSRP; determining the number of offers by the bidder for said product within a predetermined time period; declining the offer and preventing the bidder from bidding on the product for the predetermined time period if the offer is the bidder's third offer for the product within the predetermined time period and is less than VMAP; accepting the offer if the offer is equal to or less than MSRP or assigning MSRP as the agreed upon price if the offer is greater than MSRP; or calculating and providing a counter offer to the bidder if the offer is the bidder's first or second offer within the predetermined time period and is less than VMAP, wherein the counter offer is between VMAP and MSRP.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
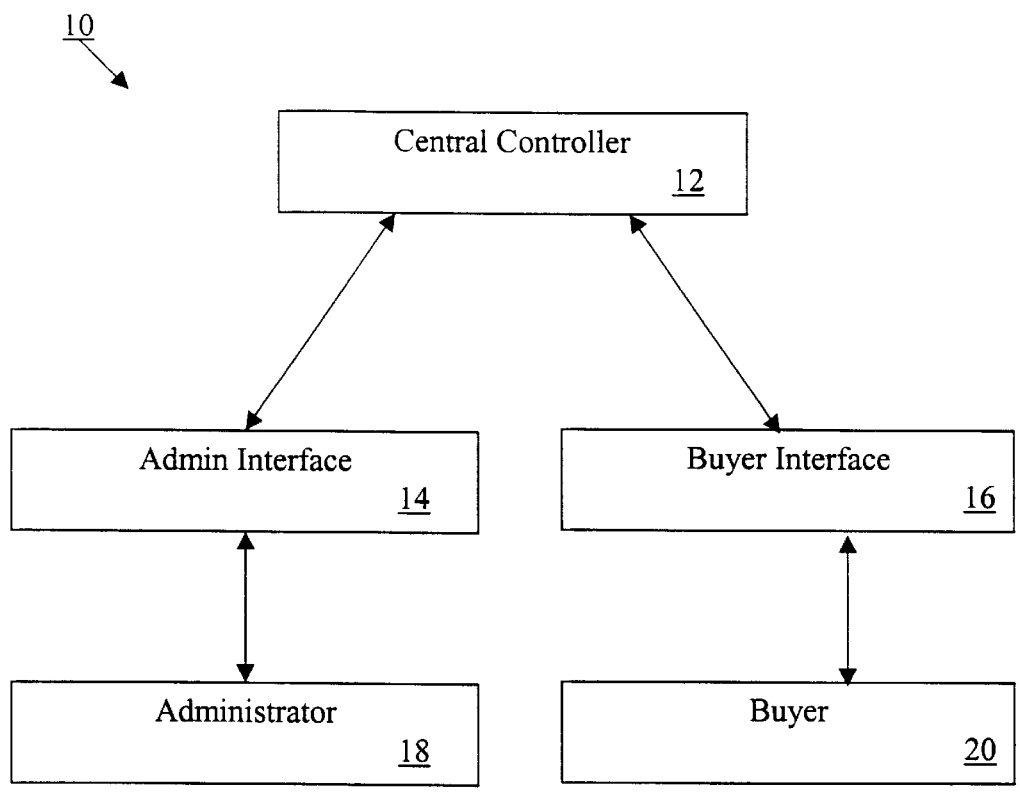
FIG. 1 is a simplified block diagram of a real-time, interactive e-commerce auction system in accordance with the principles of the present invention.

Referring to FIG. 1, there is shown in simplified block diagram form a real-time, interactive e-commerce auction system 10 in accordance with the principles of the present invention. The e-commerce auction system includes a central controller 12 connected to an administrator interface 14 and a buyer interface 16 by means of a global information network such as, for example, the Internet. An administrator 18 of the e-commerce auction system is connected to the central controller 12 by means of the administrator interface 14, while a buyer is connected to the central controller via the buyer interface 16. There is one or more system administrators 18, but many buyers. 20. The central controller.12 is programmed for automatic operation of the e-commerce auction system 10, but inputs to the system are made by both the administrator 18 and each buyer 20. Each of the administrator and buyer interfaces 14, 16 are typically in the form of a personal computer (PC) and are described in detail in the following paragraphs.

Figure 2:
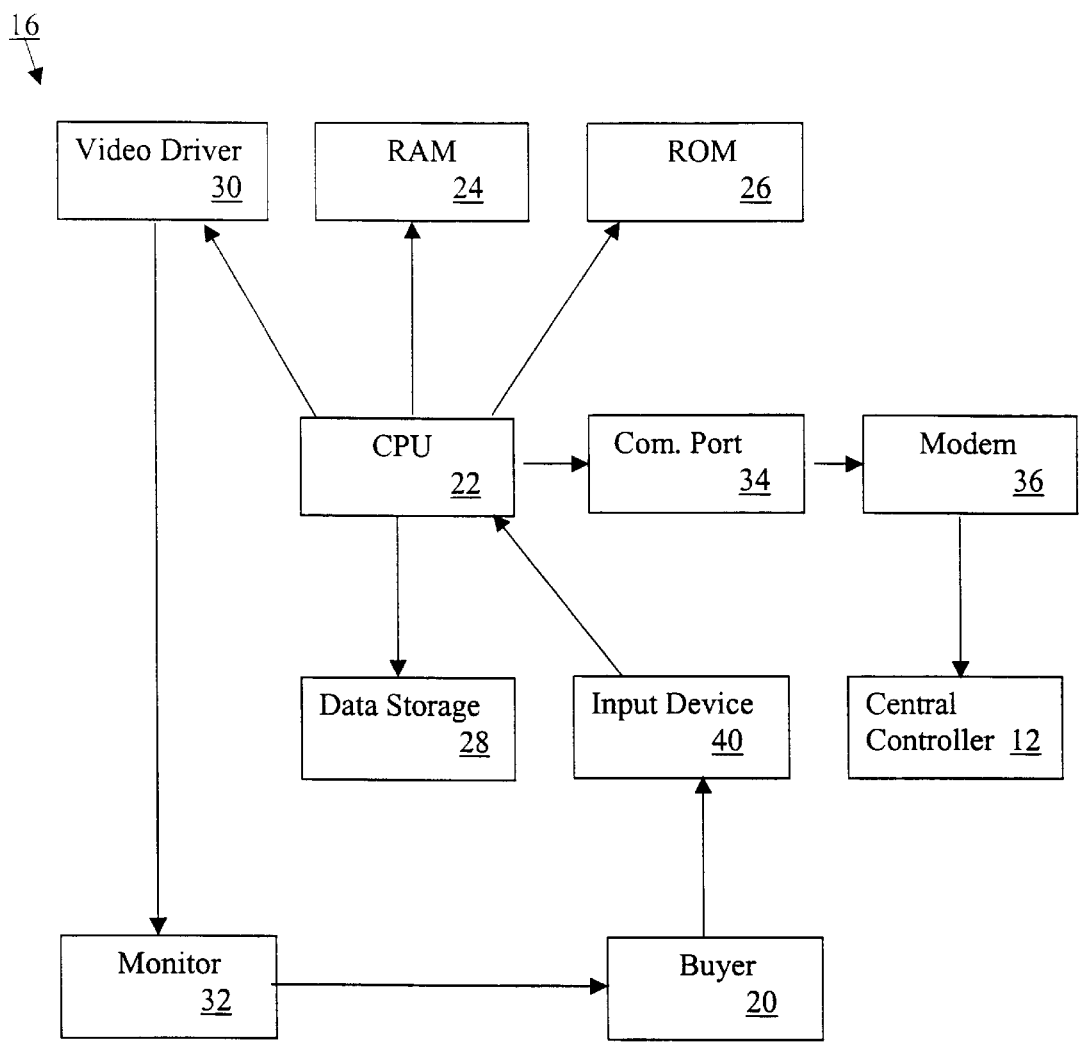
FIG. 2 is a simplified block diagram of a buyer interface for use in the e-commerce auction system of FIG. 1.

Referring to FIG. 2, there is shown in simplified block diagram form a buyer interface 16 for use in the e-commerce auction system of FIG. 1. The buyer interface 16 is typically a PC terminal incorporating an Internet browser having appropriate information fields coded within the hypertext transfer protocol (http). The buyer interface 16 includes a monitor 32 such as in the form of a cathode ray tube (CRT) which provides a video display of auction information to a buyer 20. Buyer enters inputs such as bid information via an input device 40 to a central processor unit (CPU) 22 in the buyer interface 16. Input device 40 is typically a keyboard of a PC terminal. CPU 22 controls the various components of the buyer interface 16, processes inputs to the e-commerce auction system from a buyer 20, and provides information transmitted via the global information network-.for display on the monitor 32 for use by the buyer. The buyer interface 16 further includes a random access memory (RAM) 24 and.:a read only memory (ROM) 26. Program instructions and data are stored in RAM 24 and are sequentially read from the RAM by the CPU 22 in carrying out various operations of the e-commerce auction system. Various operating parameters of the e-commerce auction system are written into and read from the RAM 24 by the CPU 22. A data storage unit 28 receives information from the CPU 22 such as customer-specific information and stores this information. CPU 22 provides appropriate inputs to a video driver 30 for displaying information on the monitor 32. CPU 22 is coupled to a modem 36 via a communications port 34. Modem 36 is, in turn, connected via an electronic communications medium such a global information network to the central controller 12 which is described in detail below. While the connection between CPU 22 and the electronic communications medium (such as the Internet) is described herein as a modem 36, virtually any conventional communications linking device for communicating with a global information network could be used in this application.

In general, the buyer reviews information regarding the various products offered in.the auction on the video display monitor 32. Buyer inputs such as product information requests or product bid information is entered by the buyer via the input device 40. Buyer inputs are processed by the buyer interface CPU-22 as well as by the central controller 12 and an appropriate response is provided to the buyer via the video display monitor 32. Buyer inputs are transmitted and processed at very high speeds, making the auction process a real-time, interactive experience under the control of the central controller 12.

Figure 3:
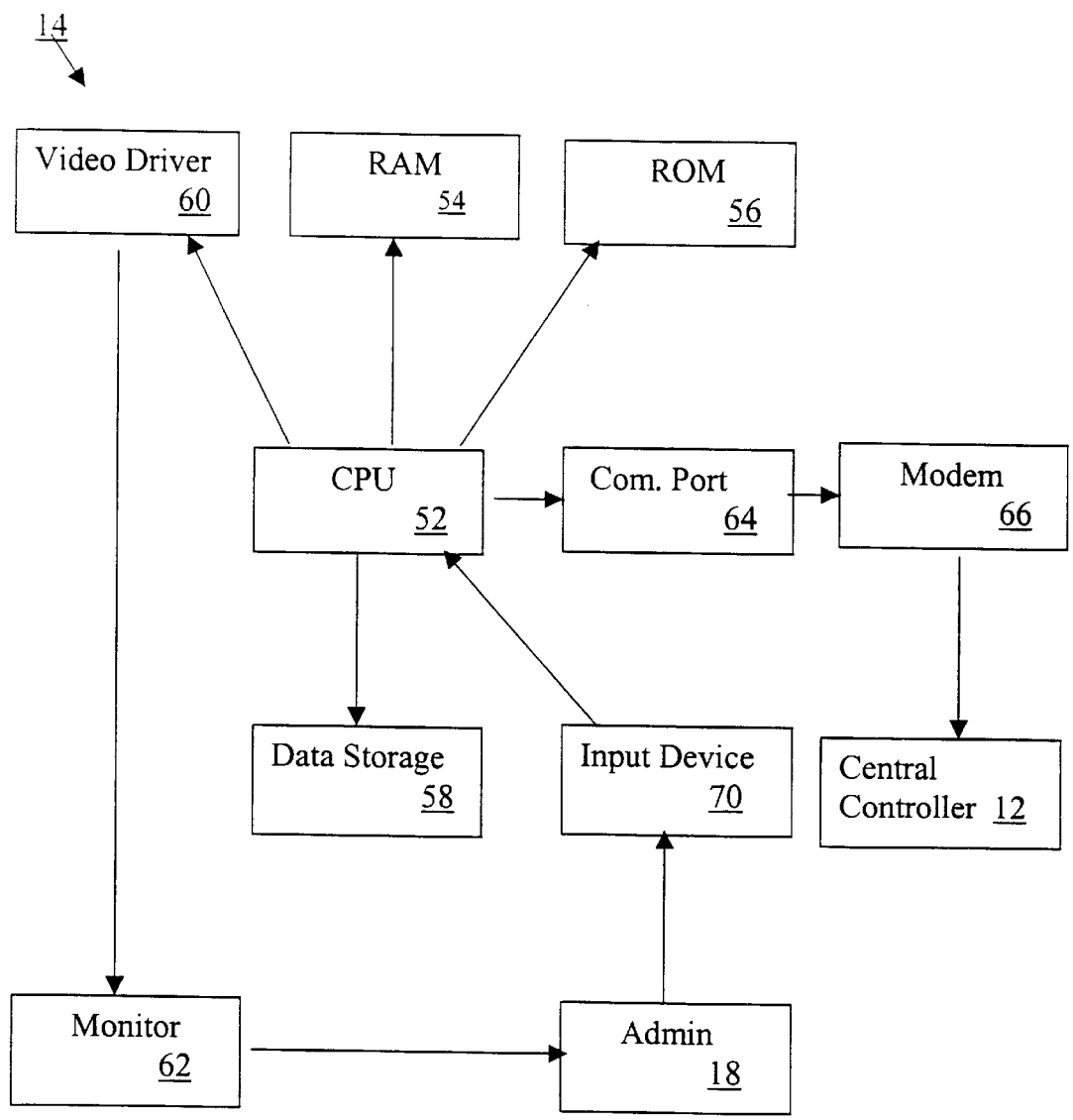
FIG. 3 is a simplified block diagram of an administrator interface for use in the e-commerce auction system of FIG. 1.

Referring to FIG. 3, there is shown a simplified block diagram of an administrator interface 14 for use in the e-commerce auction system of the present invention. As in the case of the buyer interface 16 previously described, the administrator interface 14 is also typically in the form of a PC terminal and includes an input device 70, a CPU 52, a RAM 54,.a ROM 56 and data storage 58. CPU 52 provides appropriate inputs to a video driver 60 for the presentation of product information on a monitor 62. CPU 52 is connected to the central controller 12 by means of a communications port 64 and a modem 66. Modem 66 is connected to the central controller 12 via the global information network. The various components shown in FIG. 3 of the administrator interface 14 operate substantially in the same manner as the comparable components in the previously described buyer interface 16 shown in FIG. 2, as both interface devices are preferably conventional PC terminals. Therefore, additional details of the operation and configuration of the various components of the administrator interface 14 are not provided herein for the sake of simplicity.

Figure 4:
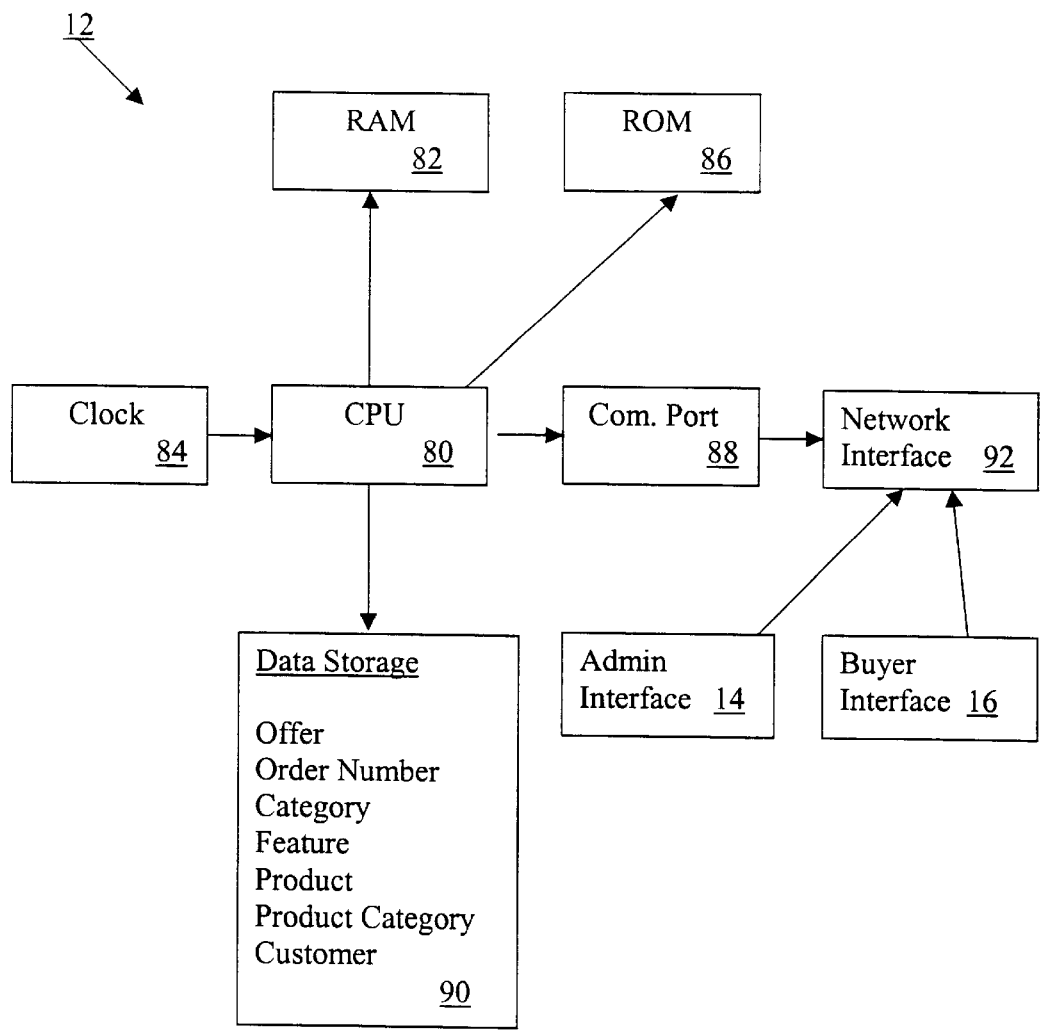
FIG. 4 is simplified block diagram of a central controller for use in the e-commerce auction system of FIG. 1.

Referring to FIG. 4, there is shown a simplified block diagram of the central controller 12 used in the e-commerce auction system of the present invention. The central controller 12 includes a CPU 80 which is connected to a clock 84. Clock 84 provides appropriate timing signals to CPU 80. for carrying out the various operations of the central.controller 12. CPU 80 is coupled to a RAM 82. and ROM 86 which store data and instructions for carrying out the various functions of the central controller 12 which are described in detail below. Also coupled to CPU 80 is a data storage unit 90. Information stored in the data storage unit 90 includes a buyer-initiated offer. Additional information stored in the data storage unit 90 by the auction administrator includes an order number, a product category, product features, product identification information, a product category and a customer identification number. The information stored in the data storage unit 90 is processed by the CPU 80 in carrying.out the auction function of the present invention. CPU 80 is connected to a network interface 92 via a communications port 88. The.network interface 92, which may take the form of a conventional Internet server, is connected to the administrator interface 14 as.well as to the buyer interface 16. The communications port 88 and network interface 92 are conventional in operation and configuration and provide a communications link between the central controller 12 and the administrator and buyer interfaces 14,16.

Figure 5:
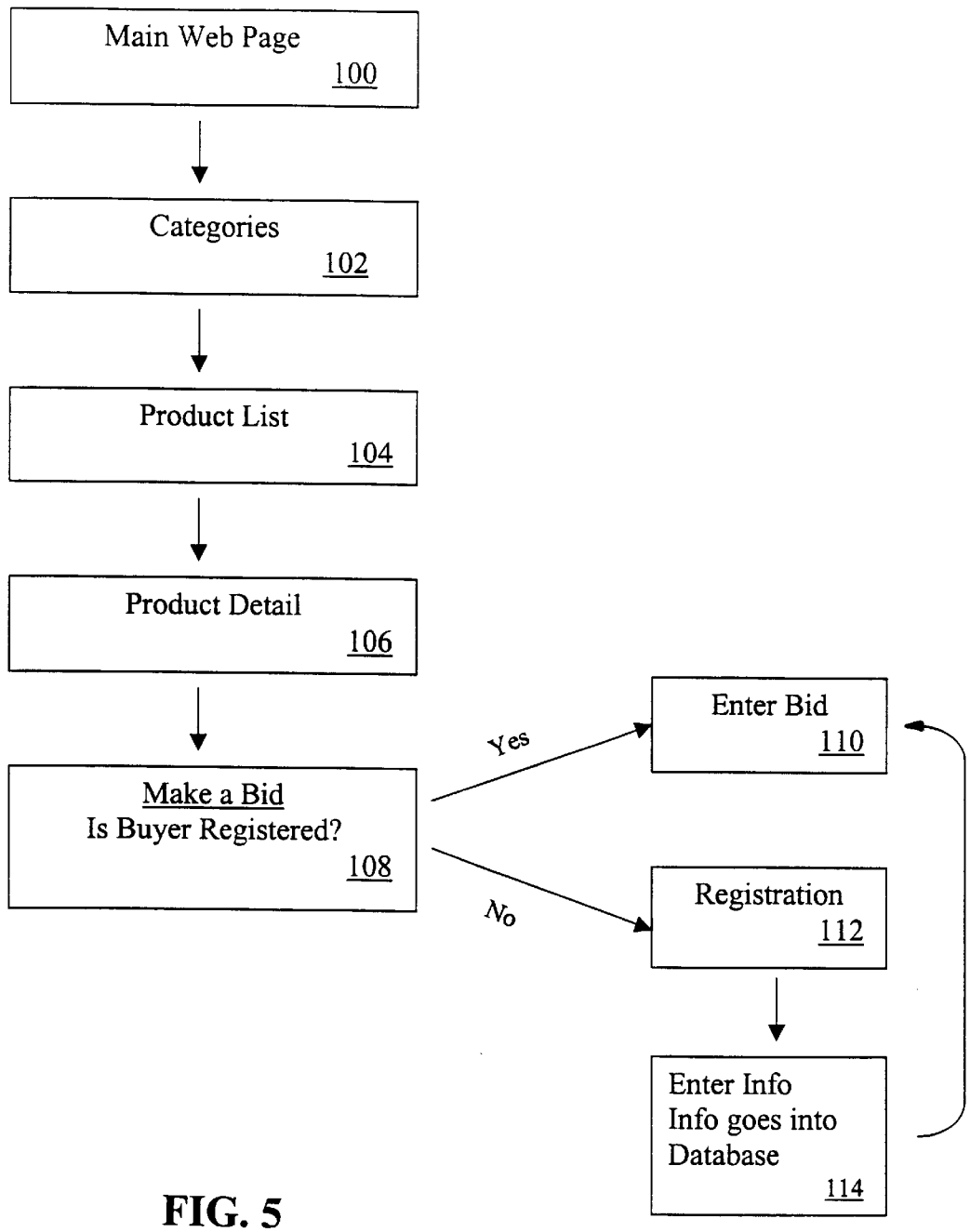
FIG. 5 is flowchart illustrating the initial steps undertaken by a buyer using the e-commerce auction system of FIG.

Referring to FIG. 5, there is shown of flow chart illustrating the steps carried out by a.buyer participating in the auction process. The buyer initiates participation in the auction process by accessing the main web page of the auction administrator at step 100. The buyer then begins $^2$drilling down$^2$ the Web site by first entering the categories of products in which the buyer is interested in step 102, and then requests a list of available products in the selected categories from the e-commerce auction system at step 104. The buyer then selects additional information regarding specific product details at step 106 and then decides to either enter a bid for a given product or products, or declines to make a bid at step 108. If the buyer submits a bid, the operating program in the central controller's CPU determines at step 108 if the buyer is registered and if he is, then he is able to enter a bid. If it is determined that the buyer is registered, the buyer's bid is entered at step 110. If at step 108 it is determined that the buyer is not.registered, the buyer is given the opportunity to register at step 112, with the buyer-entered information then stored in the data storage unit of the central controller 12 at step 114. When a buyer registers with the central controller 12, data which uniquely identifies that buyer is stored in the buyer interface RAM 24 and on disc. This data is then later used to identify the buyer and to process the buyer's product requests and auction bids. Once the buyer is registered and the relevant information is stored[]in the central controller's data storage unit 90, the buyer may then enter a bid at step 110.

Figure 6:
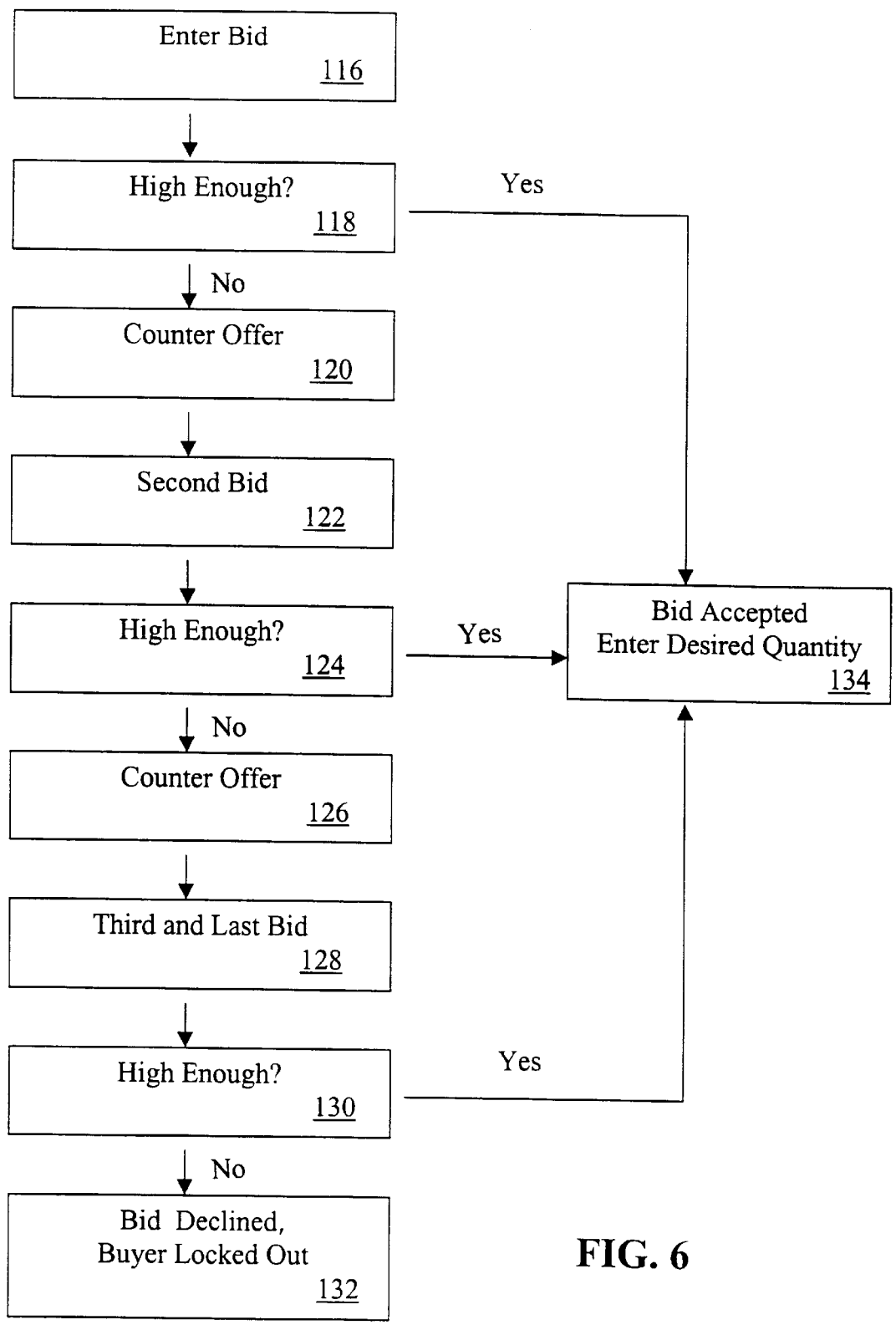
FIG. 6 is flow chart illustrating the series of steps involved in the bidding process by a buyer using the e-commerce auction system of the present invention.

Referring to FIG. 6, there is shown a flow chart illustrating the steps involved in the bid process in the e-commerce auction system of the present invention. The buyer enters a bid at step 116 and the program stored in the central controller's CPU determines if the bid is high enough at step 118. If the bid is determined to be high enough, the program proceeds to step 134, accepts the bid and prompts the buyer to enter the desired quantity of product to be purchased at step 134. If it is determined at step 118 that the bid is not high enough, the central controller provides a counter offer to the buyer at step 120 and looks for a second bid by the buyer at step 122. The program then determines at step 124 if the second bid is high enough. If at step 124 it is determined that the second bid is high enough, the program stored in the central controller's CPU accepts the bid and prompts the buyer to enter the desired quantity to be purchased at step 134. If it is determined at step 124 that the second bid is not high enough, the program then proceeds to step 126 and provides a second counter offer to the buyer. The buyer is then permitted to enter a third and last bid at step 128. At step 130 it is determined whether the third bid is high enough and if the bid is high enough, the program proceeds to step 134 and accepts the bid and permits the buyer to enter the desired quantity of product to be purchased. If at step 130 it is determined that the third bid is not high enough, the program proceeds to step 132, declines the bid, and locks out the buyer from further bidding on that particular product on the e-commerce auction system for a predetermined time period. During this period, the buyer may bid on other products.

Figure 7:
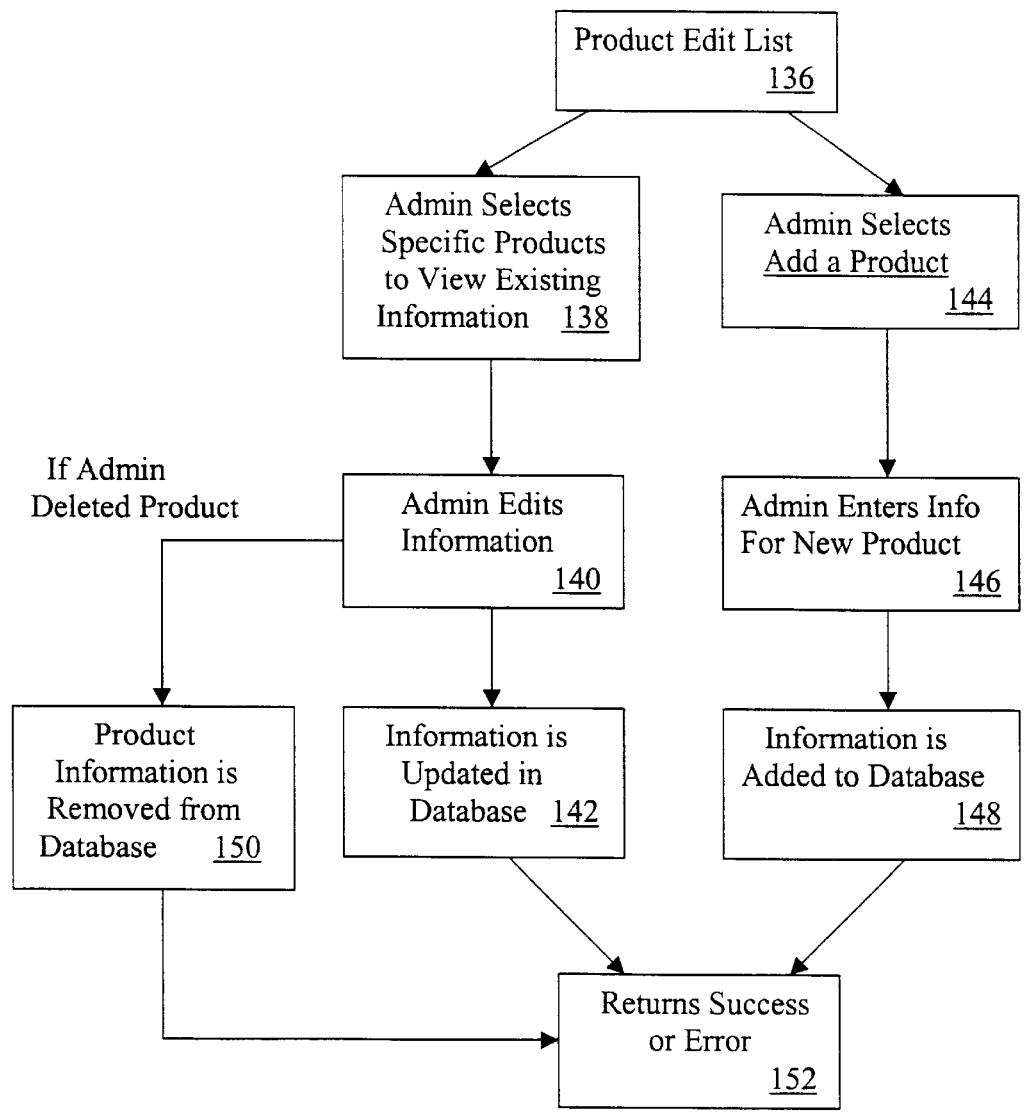
FIG. 7 is a flow chart illustrating the series of steps carried out by an administrator of the e-commerce auction system of the present invention in adding, changing or deleting product information from the system.

Referring to FIG. 7, there is shown a simplified flow chart illustrating the steps carried out by the administrator of the e-commerce auction system in preparing and maintaining the product information provided to perspective buyers via the global information network. In preparing, reviewing and updating the product information,the administrator. at step 136 begins by entering a product edit list mode at step 136. If. the product edit list mode is entered for the purpose of modifying or deleting product information, the program proceeds to step 138. If the product list edit mode is entered at step 136 for the purpose of adding information to the database for a new product, the program proceeds to step 144 At step 144, the administrator selects an add a product mode and enters the new product information at step 146. This new product information includes product identification data and the minimum acceptable price for the product. The new product information is then stored in the database in the data storage unit 90 of the central controller 12 at step 148. The program then proceeds to step 152 and returns to the main operating program for processing buyer requests and bids.

If the product edit list mode is entered at step 136 for the purpose of deleting or changing product information, the program proceeds to step 138 and the administrator selects a specific product for viewing its existing information presently stored in the central controller's data storage unit 90.

The program then proceeds to step 140 where the administrator edits the product information. The updated information is stored at step 142 in the database in the.CPU's data storage unit 90 and the program returns to the normal operation mode at step 152 for processing buyer requests and bids. If the administrator in editing product information at step,140 decides to delete a product from the e-commerce auction system, the program proceeds to step 150 and information relating to this product is deleted from the database in the CPU's data storage unit 90. The program then proceeds to step 152 for resuming normal operation and the processing of buyer requests and bids.

Figure 8:
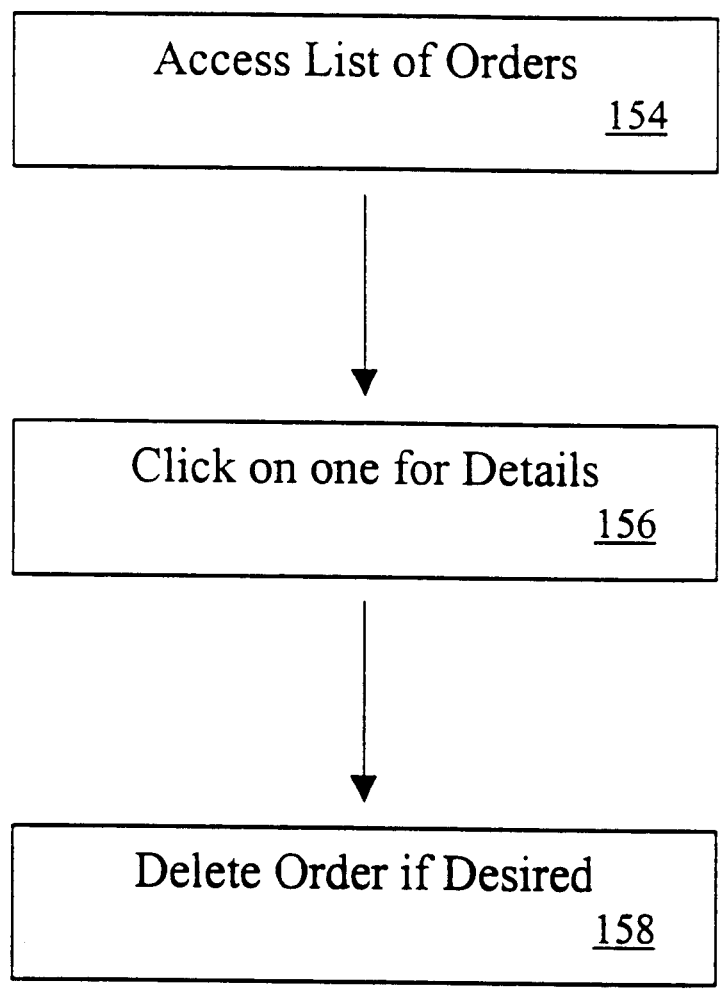
FIG. 8 is a flow chart illustrating the steps involved in the processing of a purchase order by the administrator of the e-commerce auction system of the present invention.

Referring to FIG. 8, there is shown a simplified flow chart illustrating the steps involved in the processing of buyer bids, or purchase orders, by the system administrator. The administrator at step 154 accesses the list of orders and selects one order for reviewing the details of that order at step 156. The administrator prints the order at step 158 and can delete the order, if desired.

Figure 9A:
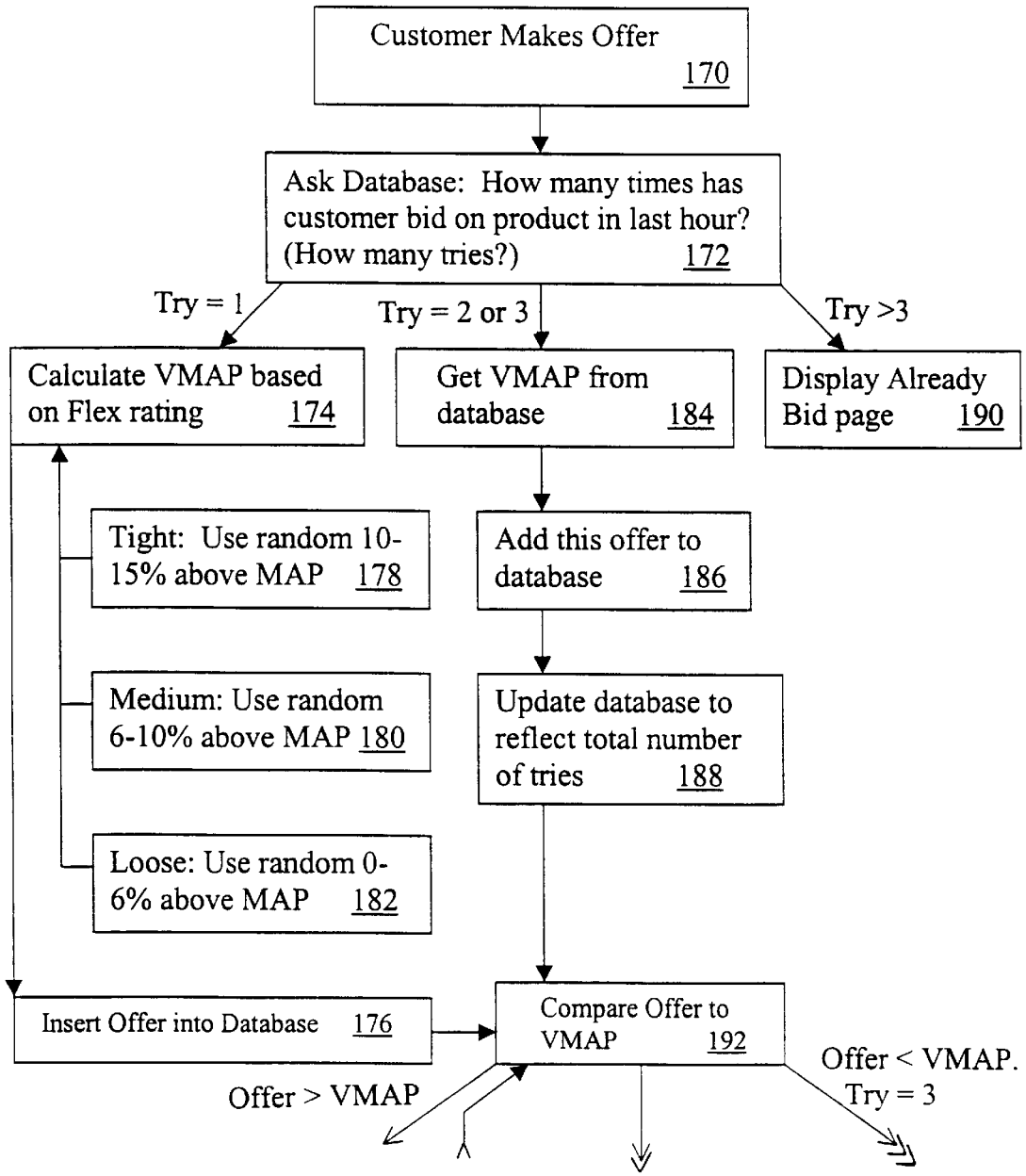
FIG. 9 is a flow chart illustrating additional details of the bidding process carried out in the auction system of the present invention.
Figure 9B:
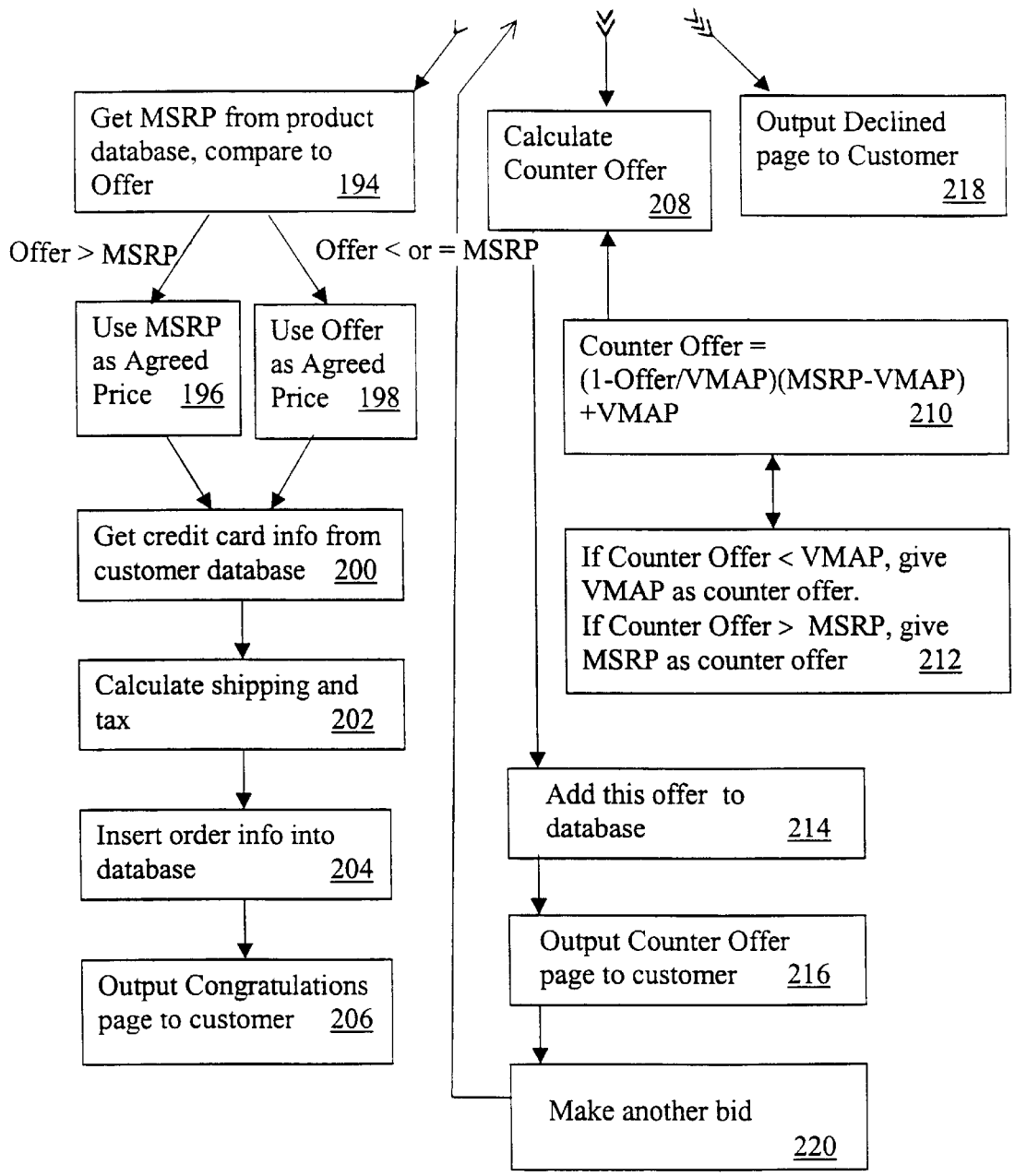

Referring to FIG. 9, there is shown a flow chart illustrating additional details of the bidding process carried out in accordance with the principles of the auction system and method of the present invention. At step 170, a customer enters an offer for a given product via the buyer interface previously described. The system at step 172 then initiates a query of the data storage unit 90 in the central controller 12 to determine if the customer has submitted a bid, or bids, on the product in question within a predetermined time period. In one embodiment of the invention, the predetermined time period is set at one (1) hour. If it is determined at step 172 that the customer has submitted more than three bids on the product in question within the preceding hour, the program locks out the bidder and proceeds to step. 190 and presents an Already Bid page on the customer's monitor. If at step 172, it is determined that the customer's bid is the first bid of that customer for that particular product within the last hour, the program proceeds to step 174 for calculating a virtual minimum acceptable price (VMAP) based upon the auction administrator's price flexibility. In calculating the VMAP, one of three categories is assigned to the Flex rating, or the administrator's price flexibility. The Flex rating is entered by the administrator at the time new product information is entered as-previously described in terms of FIG. 7. If there is little flexibility in administrator's price, a tight Flex rating is used in calculating the VMAP. In this case, VMAP is determined at step 178 using a random number generator, where the random number is 10–15% above the minimum acceptable price (MAP) previously assigned to that product. If the administrator's price flexibility is in the medium range, the random number generator is used at step 180 to calculate a VMAP which is somewhere in the range of 6–10% above the MAP. Finally, where the administrator believes there is substantial flexibility in the asking price for the product, a loose Flex rating is used in calculating VMAP using the random number generator. In this latter case, where a loose Flex rating is used, a random number representing VMAP is generated in the range of 0–6% above the MAP as indicated at step 182. Once the VMAP is calculated at step 174, this value is entered as a bidder's offer by the administrator into the data storage unit 90 of the central controller 12 at step 176. The program then again compares the bidder's latest offer to the VMAP at step 192.

Where it is the bidder's second or third try, the program in the central controller 12 again retrieves the VMAP from, the database in the data storage unit 90 in the central controller at step 1.84. The bidder's offer is then added to the database in the data storage unit 90 of the central controller 12 at step 186, followed by an updating of the database to reflect the total number of tries, or bids, by the customer at step 188. The program then again compares the bidder's latest offer to the VMAP at step 192.

Depending upon the results of the comparison of the bidder's latest offer with the VMAP at step.192, the program will branch to one of several subroutines. Thus, if at step 192 it is determined that the offer is greater than the VMAP, the program branches to step 194 and obtains the manufacturer's suggested retail price (MSRP) from the product database stored in the data storage unit 90 of the central controller 12. At step 194, the program also compares the bidder's latest offer with the.MSRP for the product in question and proceeds to either step 196 or step 198. If the bidder's latest offer is greater than the MSRP, the program branches to step 196 and sets the MSRP as the agreed-upon price. The program thus limits the maximum price that a bidder will pay to that of the MSRP in order not to take advantage of excessively high bids mistakenly or inadvertently entered by the bidder. If at step 194 it is determined that the offer is less than or equal to the MSRP, the bidder's latest offer is used to establish the agreed-upon price at step 198. Once the agreed-upon price is determined, whether it is the MSRP or the bidder's latest offer, the.program proceeds to step 200 to obtain credit card and shipping information which is entered by the bidder when the first bid is entered and is stored in the buyer's interface RAM 24. The program then compares the zip code of the location from which the product. is to be shipped with.the zip code of where the product is to be shipped at step 202 and calculates the shipping.costs as well as the state tax in accordance with the residence of the purchaser. The program then at step 204 inserts the order information into the database stored in the central controller's data storage unit 90,and outputs a Congratulations page to the customer at step 206.

If at step 192, it is determined that the bidder's latest offer is less than the VMAP and that the bid is the bidder's first or second try, the program branches to step 208 for the purpose of calculating a counter offer. The counter offer is calculated at step 210 using the following formula:

$$\text{Counter Offer} = \left[1 - \frac{\text{Offer}}{VMAP}\right][MSRP - VMAP] + VMAP \quad \text{(Eq. 1)}$$

From Equation 1, it can be seen that the counter offer will always be greater than VMAP, unless the first term on the right hand side of Equation 1 is less than 0. The first term in Equation 1 can only be less than 0 if the offer is greater than VMAP. In the event that the buyer's offer is greater than VMAP, the offer is accepted. The net effect of Equation 1 is that if the bidder submits a bid lower than VMAP, the program responds by issuing a counter offer greater than VMAP. Also as shown in step 212, limits are placed on the counter offer. Thus, if the counter offer is less than VMAP, the program assigns VMAP as the counter offer. On the other hand, if the counter offer is greater than MSRP, the program assigns MSRP as the counter offer in calculating the counter offer at step 208. Thus, any counter offer will be between VMAP and MSRP. Once the counter offer is calculated, the counter offer is stored in the central controller's data storage unit 90 at step 214 and the counter offer is output to the customer's interface at step 216. The customer is then given the opportunity to submit another bid at step 220 and the program then returns to step 192 to compare the bidder's next bid with VMAP.

If at step 192 it is determined that the offer is less than VMAP and it is the bidder's third bid for the same product, the program branches to step 218 declines the bidder's latest offer and provides an indication of this to the bidder with a Declined page displayed on the customer's monitor. The program then returns to the flow chart in FIG. 5 where a buyer accesses the main web page, requests product information, and enters a bid for a product.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawing is offered by way of illustration only and not as a limitation. The actual scope of the invention is intended to be defined in the following claims when viewed in their proper perspective based on the prior art.

We claim:

1. An auction method for use in e-commerce where an administrator of the auction is connected to a bidder by means of a global information network, said method comprising the steps of:

assigning a minimum acceptable price (MAP) to a product based upon the cost of the product and a manufacturer's suggested retail price (MSRP) for the product, where MSRP>MAP;

calculating a virtual minimum acceptable price (VMAP) for the product, where VMAP is a randomly calculated percent greater than MAP for the product, and wherein VMAP is calculated by assigning a tight, medium or loose bidding range for the product, with VMAP having a tight bidding range assigned a value X% greater than MAP, VMAP having a medium bidding range assigned a value Y% greater than MAP, and VMAP having a loose bidding range assigned a value Z% greater than MAP, where X>Y>Z;

receiving an offer for a product from a bidder via the global information network;

comparing the offer with VMAP and MSRP;

determining the number of offers by said bidder for said product within a predetermined time period;

declining said offer and preventing the buyer from bidding on said product for said predetermined time period if the offer is the buyer's third offer within said predetermined time period and is less than VMAP;

accepting the offer if the offer is equal to or less than MSRP or assigning MSRP as the agreed upon price if the offer is greater than MSRP; or calculating and providing a counter offer to the buyer if the offer is the bidder's first or second offer within said predetermined time period and is less than VMAP, wherein said counter offer is between VMAP and MSRP.

2. The method.of claim 1 wherein:

X=10–15% greater than MAP,

Y=6–10% greater than MAP, and

Z=0–6% greater than MAP.

3. The method of claim 1 further providing an indication to the bidder of a declining of an offer where the offer is the bidder's third or more offer for the product within said predetermined time period.

4. The method of claim 1 wherein said predetermined time period is 1 hour.

5. The method of claim 1 further comprising the step of receiving a request for product information from a bidder and providing information relating to a product to the bidder.

6. The method of claim 1 further comprising the step of verifying that the bidder is registered with the administrator before permitting the bidder to enter an offer.

7. The method of claim 1 further comprising the step of calculating shipping costs and sales tax for the sale of a product in accordance with the zip codes of the location from which the product is to be shipped as well as the destination of the product and the state of residence of the bidder.

8. The method of claim 1 wherein said counter offer is equal to $$\left[1 - \frac{\text{Offer}}{VMAP}\right][MSRP - VMAP] + VMAP$$

* * * * *

UNITED STATES PATENT AND TRADEMARK OFFICE
CERTIFICATE OF CORRECTION

PATENT NO. : 6,606,607 B1
DATED : August 12, 2003
INVENTOR(S) : Sam Martin et al.

It is certified that error appears in the above-identified patent and that said Letters Patent is hereby corrected as shown below:

Title page,
Item [56], References Cited, FOREIGN PATENT DOCUMENTS, correct the number of the Japanese patent from "40532690" to Japanese Patent No. -- 405324690 --

Column 1,
Line 33, delete the period "." between "the" and "cost"
Line 52, delete the period "." between "in" and "response"
Line 57, delete the period "." between "an" and "item"

Column 3,
Line 18, delete the period "." between "buyers" and "20"
Line 18, delete the period "." between "controller" and "12"
Line 39, delete the hyphen "-" after the word "network"
Line 42, delete the period & colon ".:" between "and" and "a"
Line 62, delete the period "." between "in" and "the"

Column 4,
Line 11, delete the period "." between "RAM 54," and "a"
Line 29, delete the period "." after "CPU 80"
Line 30, delete the period "." between "central" and "con-"
Line 31, delete the period "." between "RAM 82" and "and"
Line 42, delete the period "." between "ing" and "out"
Line 44, delete the period "." between "The" and "network"
Line 46, delete the period "." between "14 as" and "well"
Line 52, delete the period "." between "a" and "buyer"

Column 5,
Line 1, delete the period "." between "not" and "registered"
Line 10, delete the brackets "[]" between "stored" and "in"
Line 47, insert a space between "information," and "the"
Line 47, delete the period "." between "administration" and "at"
Line 49, delete the period "." between "If" and "the"
Line 54, insert a period "." after "144" and before "At"

Column 6,
Line 3, delete the period "." between "the" and "CPU's"
Line 7, delete the comma "," between "step" and "140"
Line 43, delete the hyphen "-" between "as" and "previously"
Line 64, delete the comma "," after the word "from"
Line 66, "1.84" should be -- 184 --.

UNITED STATES PATENT AND TRADEMARK OFFICE
CERTIFICATE OF CORRECTION

PATENT NO. : 6,606,607 B1
DATED : August 12, 2003
INVENTOR(S) : Sam Martin et al.

It is certified that error appears in the above-identified patent and that said Letters Patent is hereby corrected as shown below:

Column 7,
Line 6, delete the period "." between "step" and "192"
Line 13, delete the period "." between "the" and "MSRP"
Line 23, delete the period "." between "the" and "program"
Line 28, delete the period "." between "product" and "is"
Line 28, delete the period "." between "with" and "the"
Line 30, delete the period "." between "shipping" and "costs"

Column 8,
Line 31, after the words "greater than" insert -- or equal to --
Line 38, replace "X>Y>Z" with -- X$\geq$Y$\geq$Z --

Signed and Sealed this

Fourth Day of November, 2003

JAMES E. ROGAN
*Director of the United States Patent and Trademark Office*